(No Model.)
S. M. GA NUN & G. F. PARSONS.
EYEGLASSES.
No. 364,340. Patented June 7, 1887.
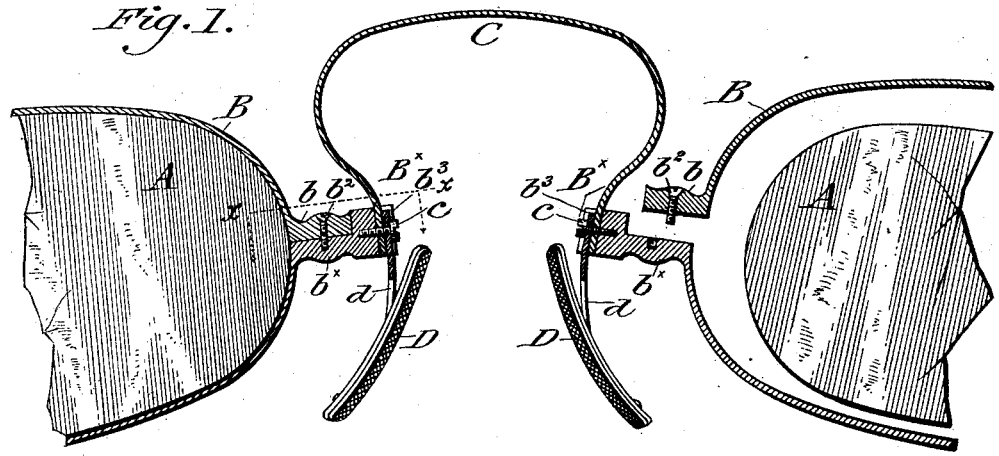
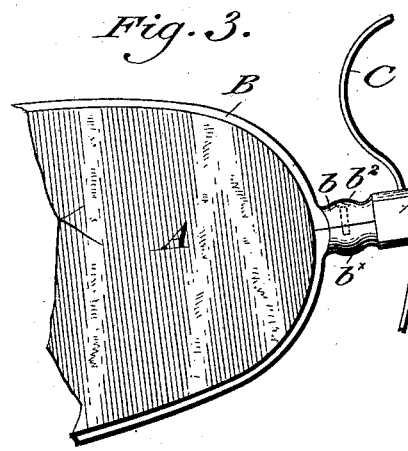
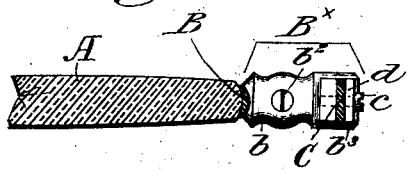
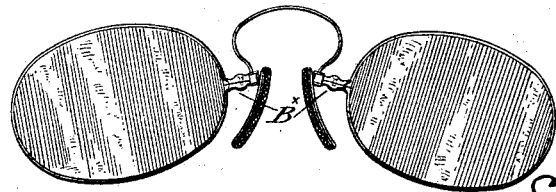
WITNESSES:
INVENTORS
Stephen M. Ga Nun,
George F. Parsons,
By their Attorneys,

United States Patent Office.

STEPHEN M. GA NUN AND GEORGE F. PARSONS, OF NEW YORK, ASSIGNORS TO H. E. KIRSTEIN, OF ROCHESTER, NEW YORK.

EYEGLASSES.

SPECIFICATION forming part of Letters Patent No. 364,340, dated June 7, 1887.

Application filed January 6, 1887. Serial No. 223,536. (No model.)

*To all whom it may concern:*

Be it known that we, STEPHEN M. GA NUN and GEORGE F. PARSONS, both citizens of the United States, and both residents of the City of New York in the State of New York, have jointly invented certain Improvements in Eye Glasses, of which the following is a specification.

The object of our invention is the construction of an eye glass frame the rims of which, while encircling the lenses, are yet so applied thereto as to cause said lenses, at a little distance, to present the appearance of being rimless, and are also free from the usual coupling lugs.

Rimless eye glass lenses are, as is well known, secured to the uniting bow spring by clamping studs which embrace or overlap the inner portions of the lenses and are connected to said lenses by fastening devices which pass through holes drilled in the lenses,—a construction objectionable because of the danger of breaking the lenses in drilling, because of the liability of the lenses if dropped to break, and because the studs, which come upon the fields of the lenses, are often visible to the wearer to an annoying extent.

Light rims encircling the lenses are, as is obvious, an advantage, because rendering the lenses more durable and maintaining their fields clear.

In the eye glass frame which constitute the subject of this invention, we employ rims which are continuous throughout their extent except at the point of their application to the studs which carry them, and to which studs the bow spring and, if desired, the nose clamps are secured; and make the studs themselves sectional or in two parts, which parts are respectively secured to the respective meeting extremities of the internally divided rims and are adapted to be connected together by screws, or kindred fastening contrivances, so as to clamp the rims upon the lenses, the sectional parts of the studs thus formed to be secured together, being fitted and adapted to each other not only mechanically as to their meeting faces, but artistically as to their entire contour, so that when joined together they form a symmetrical, sightly, and apparently integral whole.

An eye glass frame embodying our invention is represented in the accompanying drawings and described in this specification, the particular subject matter claimed as novel being hereinafter definitely specified.

In the drawings, Figure 1 is a sectional magnified, fragmentary, front elevational detail through so much of an eye glass frame embodying our invention as is necessary to exhibit said invention. Fig. 2 is a top plan of one of the sectional coupling studs of the device, section being supposed through the bow spring and through the upper portion of the rim, in the plane of the dotted line $x$-$x$ of Fig. 1, and sight being taken in the direction of the arrows upon said line. Fig. 3 is a fragmentary front elevation of one of the rims with its lense in place; and Fig. 4 is a front elevational view of the entire frame with the lenses in place.

Similar letters of reference indicate corresponding parts

In the drawings, A A are the lenses, and B the metal rims which embrace and retain said lenses. These rims are continuous throughout their extent except at or near the point where the major axes of the lenses, if prolonged, would intersect them, at which point they the said rims are divided and terminate in, or are laterally prolonged into, the two projecting members $b$ $b^\times$ which together compose a given coupling stud $B^\times$, which we so term, because the two component members of each of said studs when secured together by a coupling screw $b^2$ form a coupling for one of the rims. The coupling studs, however, not only constitute couplings to unite the divided meeting extremities of the rims, but also studs, posts, or standards for the connection of each rim as an entirety with one extremity of the rim-uniting bow spring C, which latter is of any usual character and conveniently secured at its respective extremities to said coupling studs by the screws $c$ which pass through holes in the extremities of the spring and enter threaded axial orifices formed in the outer extremities or heads of said coupling studs.

$d$ are arms which carry nose clamps D, and are respectively secured to the coupling studs by the bow screws $c$, in a manner well known in the art. The outer extremities or heads of the coupling studs are channeled, or, better phrased, provided with side plates $b^3$ between which the extremities of the bow spring and of the arms of the nose clamps seat themselves and fit closely, as shown in Fig. 2.

In the form of construction represented, the under portions of the rims are connected with the lower members $b^\times$ of the coupling studs, the said lower members being extended to form the heads of said studs and constituting their major portions; while the upper members $b$, which are connected with the upper portions of the rims, constitute the minor portions of the studs and are fitted accurately to the lower members and against the heads of said studs, as shown in Fig. 1.

The coupling screws $b^2$ are conveniently applied to either of the two members of the respective studs, but, preferably, are countersunk into the upper members and threaded into the lower.

It is, of course, apparent that the construction represented and described can be reversed, and the upper members of the coupling studs be formed as the major portions of said studs. The respective members of the coupling stud can be either formed as a part of the rims, or be soldered or brazed or otherwise conveniently connected therewith.

The coupling studs as an entirety are as to both of their members turned or formed to a cylindriform or other desired ornamental external configuration.

Other devices than the coupling screws $b^2$ can similarly be employed to unite the two members of the studs and clamp the rims upon the lenses.

The mode of attachment of the bow spring can be varied at pleasure, and, if desired, the nose clamps can be omitted.

The device is of course applicable to spectacle frames, the temples being secured to lugs brazed upon or otherwise applied to the outer continuous portions of the rims.

Having thus described our invention, we claim:

1. An eye glass frame having externally continuous rims, internally divided and provided at the points of division each with a sectional member of a coupling stud, one of said sectional members being, at its outer extremity, of the full diameter of the completed stud, and axially apertured to receive a screw which passes through and secures thereto the bow spring, and said sectional members being together adapted when secured together to lie one within the other and together to complete the exterior of the contour of the stud as such, substantially as set forth.

2. The combination to form an eye glass frame substantially such as set forth, of the externally continuous internally divided rims B, the coupling studs $B^\times$ the respective members $b\ b^\times$ of which are connected with the meeting extremities of the internally divided rims, the coupling screws $b^2$ for securing said members together, the bow springs C, the nose clamps D having arms $d$, and suitable means for attaching the extremities of the bow spring and the arms of the nose clamps to the coupling studs, substantially as set forth.

In testimony whereof we have hereunto signed our names this 20th day of December A. D., 1886

STEPHEN M. GANUN
GEO F. PARSONS

In the presence of
D. N. CARVALHO.
WALTER. F. METCALF